US012606756B2

(12) United States Patent
Bromberg et al.

(10) Patent No.: US 12,606,756 B2
(45) Date of Patent: Apr. 21, 2026

(54) CONTROL OF POWER PRODUCING ENGINE IN A BIOMASS CONVERSION SYSTEM

(71) Applicant: Massachusetts Institute of Technology, Cambridge, MA (US)

(72) Inventors: Leslie Bromberg, Sharon, MA (US); Emmanouil Kasseris, Cambridge, MA (US); Yu Chen, Allston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 929 days.

(21) Appl. No.: 17/792,825

(22) PCT Filed: Aug. 13, 2020

(86) PCT No.: PCT/US2020/046121
§ 371 (c)(1),
(2) Date: Jul. 14, 2022

(87) PCT Pub. No.: WO2021/150271
PCT Pub. Date: Jul. 29, 2021

(65) Prior Publication Data
US 2023/0038264 A1 Feb. 9, 2023

Related U.S. Application Data

(60) Provisional application No. 62/965,169, filed on Jan. 24, 2020.

(51) Int. Cl.
*C10J 3/72* (2006.01)
*F02B 43/08* (2006.01)

(52) U.S. Cl.
CPC ............... *C10J 3/723* (2013.01); *F02B 43/08* (2013.01); *C10J 2300/0956* (2013.01); *C10J 2300/1671* (2013.01)

(58) Field of Classification Search
CPC ...... C10J 3/723; C10J 2300/1671; C10J 3/84; C10J 2300/0916; C10J 2300/165;
(Continued)

(56) References Cited

U.S. PATENT DOCUMENTS 5,688,296 A 11/1997 Andrus, Jr. et al.
6,609,582 B1 * 8/2003 Botti ......................... F02B 1/12 903/905

(Continued)

FOREIGN PATENT DOCUMENTS

WO 2018/119032 A1 6/2018

OTHER PUBLICATIONS

International Search Report and Written Opinion mailed Nov. 9, 2020 in corresponding PCT application No. PCT/US2020/046121.

*Primary Examiner* — Hung Q Nguyen
(74) *Attorney, Agent, or Firm* — Nields, Lemack & Frame, LLC

(57) ABSTRACT

A biomass conversion system is disclosed. The system comprises a syngas generator, a cleanup engine and a power producing engine. The power producing engine is coupled to a load, such as an electrical generator. Methods of controlling the power producing engine in response to changes in load are disclosed. In certain embodiments, the air-to-fuel ratio, spark timing, and/or recirculation gases are varied to change the power of the power producing engine. In other embodiments, the power producing engine is throttled by limiting the amount of clean syngas that enters the engine.

22 Claims, 3 Drawing Sheets

(58) Field of Classification Search
CPC ... F02B 43/08; B01D 53/944; B01D 53/9445; C10K 3/005; C10K 3/008; C10K 3/003; Y02T 10/30
See application file for complete search history.

(56) References Cited

U.S. PATENT DOCUMENTS

| | | | |
|---|---|---|---|
| 8,205,594 | B2 | 6/2012 | Fore et al. |
| 8,567,355 | B2 | 10/2013 | Wang et al. |
| 8,959,885 | B2 | 2/2015 | Kidambi et al. |
| 2016/0065003 | A1 | 3/2016 | Preston |
| 2017/0320498 | A1 | 11/2017 | Miller et al. |

* cited by examiner

CONTROL OF POWER PRODUCING ENGINE IN A BIOMASS CONVERSION SYSTEM

This application claims priority of U.S. Provisional Patent Application Ser. No. 62/965,195, filed Jan. 24, 2020, the disclosure of which is incorporated by reference in its entirety.

FIELD

The present invention is in the technical field of power generation; and more specifically, in the technical field of purification control and power generation resulting from the gasification of solid fuel.

BACKGROUND

There is a clear and unmet need for transformative technologies to improve biomass to power systems by reducing their cost and complexity to make them more competitive with fossil fuels.

According to the Union of Concerned Scientists, biomass resources totaling just under 680 million dry tons could be made available, in a sustainable manner, each year within the United States by 2030. This is enough biomass to produce 732 billion kilowatt-hours of electricity (19 percent of total U.S. power consumption in 2010). These biomass resources are distributed widely across the United States, ensuring that communities across America can benefit both financially and environmentally from increased biomass production. If allowed to biodegrade on its own, this biomass will generate substantial amounts of greenhouse gas (GHG) methane emissions. Approximately 6.5 liters of $CH_4$ are generated per kilogram of decaying biomass.

Globally, biomass represents a huge hope for rural electrification in a sustainable, low cost manner that can trigger economic development based on largely local resources. According to the World Bank, rural electrification can have a profound impact on reducing poverty and improving welfare in the developing world. The developing world already relies on biomass for its energy needs, in particular, for cooking. Furthermore, developing decentralized power generation in the developing world may in many cases make more sense compared to having to invest in a large centralized grid.

Because of the cost of transporting the biomass, biomass is preferably consumed locally, using small gasifiers. The main limitation of small scale gasification systems today is the cost of gas cleanup.

The producer gas created from biomass gasification has high tar content. Tars are large molecule hydrocarbons and are considered contaminants because they cause fouling on hardware surfaces, such as pipes, catalysts and valves. The tar content in the producer gas needs to be reduced to a certain level before further utilization of the syngas, such as for power generation or chemical synthesis. Although there are many existing, mature tar purification technologies, these technologies are usually expensive, which makes the commercial utilization of syngas with high tar content becomes unfeasible.

The idea of using hot, rich combustion in an internal combustion engine as a cleanup system to break down tar into small molecule hydrocarbons was proposed in WO2018119032A1 as a replacement of existing tar purification technologies. The purpose of hot combustion (above the tar dew point) is to break down the tars while they are still in the gaseous phase, before they can condense to cause fouling. The purpose of rich combustion is to release enough heat to break down tars into smaller molecules that do not cause fouling, but not damage the engine due to autoignition. The gases inside the engine are prone to autoignition due to the high intake temperatures. Limiting the stoichiometry to rich controls the amount of autoignition heat release and thus protects the engine.

The successful application of the engine cleanup system may bring down the tar purification cost of syngas significantly. The purified syngas then can be directly used in a power producing engine or to manufacture chemicals. Consequently, the commercial utilization of biomass gasification becomes feasible.

The integrated system proposed in WO2018119032A1 has three separate components that must be independently controlled and powered. Therefore, a system and method that allows for the control of these components would be beneficial.

SUMMARY

A biomass conversion system is disclosed. The system comprises a syngas generator, a cleanup engine and a power producing engine. The power producing engine is coupled to a load, such as an electrical generator. Methods of controlling the power producing engine in response to changes in load are disclosed. In certain embodiments, the air-to-fuel ratio, spark timing, and/or recirculation gases are varied to change the power of the power producing engine. In other embodiments, the power producing engine is throttled by limiting the amount of clean syngas that enters the engine.

According to one embodiment, an integrated system for producing power from solid fuels is disclosed. The system comprises a syngas generator to form producer gas from solid fuels; a cleanup engine in communication with an outlet of the syngas generator to remove tar from the producer gas and create cleaned syngas; a power producing engine in communication with an outlet of the cleanup engine to generate power; a power engine fuel actuator disposed between the outlet from the cleanup engine and an inlet of the power producing engine; a power engine air filter; a power engine air actuator in communication with the power engine air filter and an inlet of the power producing engine; a sensor to determine a speed of the power producing engine; and a controller in communication with the power engine fuel actuator, the power engine air actuator, and the sensor. In certain embodiments, the sensor to determine the speed of the power producing engine comprises a speed sensor. In some embodiments, the system further comprises an electric generator coupled to a drive shaft of the power producing engine, and the sensor to determine the speed of the power producing engine comprises an electrical frequency sensor. In some embodiments, the controller throttles the power engine fuel actuator and the power engine air actuator based on the speed of the power producing engine. In some embodiments, the system further comprises a power engine sensor to detect knock in the power producing engine, and the controller is in communication with the power engine sensor. In certain embodiments, the controller throttles the power engine fuel actuator and the power engine air actuator based on the speed of the power producing engine and a signal from the power engine sensor. In some embodiments, an air-to-fuel ratio (λ) of the power producing engine is kept constant. In certain embodiments, the system further comprises a recirculation actuator to allow syngas exhausted from the cleanup engine to recirculate to an inlet of the cleanup engine. In some embodiments, the controller controls the recirculation actuator based on the speed of the power producing engine. In some embodiments, the system further comprises a generator flare; a syngas flare actuator disposed between an output of the syngas generator and the generator flare; a cleanup air filter; a cleanup air actuator disposed between an inlet of the cleanup engine and the cleanup air filter; and the controller is in communication with the syngas flare actuator and the cleanup air actuator to modify a flow rate of producer gas and air to the cleanup engine. In certain embodiments, the controller throttles the power engine air actuator based on the speed of the power producing engine to change an air-to-fuel ratio (λ) of the power producing engine. In certain embodiments, a catalytic converter is disposed at an outlet of the power producing engine to neutralize gasses when the air-to-fuel ratio becomes rich. In some embodiments, the controller throttles the power engine fuel actuator based on the speed of the power producing engine to change an air-to-fuel ratio (λ) of the power producing engine. In some embodiments, exhaust gas from the power producing engine is recirculated to an inlet of the power producing engine, the cleanup engine and/or the syngas generator to reduce pumping losses caused by throttling. In certain embodiments, spark timing is modified based on the speed of the power producing engine. In some embodiments, the power engine fuel actuator is adjusted and pressure builds up at the outlet of the cleanup engine, and the pressure serves to reduce a power output of the cleanup engine. In some embodiments, the power engine fuel actuator is adjusted, and the system further comprises a cleanup flare; and a cleanup flare actuator disposed between an output of the cleanup engine and the cleanup flare; and the controller is in communication with the cleanup flare actuator such that excess syngas at the outlet of the cleanup engine is burned in the cleanup flare by opening the cleanup flare actuator. In certain embodiments, the system further comprises an electric generator coupled to a drive shaft of the power producing engine. In some embodiments, a battery or load bank is in electrical communication with the electric generator, such that the load presented by the electric generator to the power producing engine is constant.

According to another embodiment, a method of controlling the system described above is disclosed. The method comprises throttling the power engine fuel actuator and the power engine air actuator based on a speed of the power producing engine. According to another embodiment, the method comprises throttling the power engine fuel actuator and the power engine air actuator based on the speed of the power producing engine and a signal from a power engine sensor, wherein the power engine sensor detects knock in the power producing engine. In certain embodiments, an air-to-fuel ratio (λ) of the power producing engine is kept constant.

According to another embodiment, a method of controlling the system described above is disclosed. The system further comprises a recirculation actuator to allow syngas exhausted from the cleanup engine to recirculate to an inlet of the cleanup engine, and the method comprises controlling the recirculation actuator based on a speed of the power producing engine.

According to another embodiment, a method of controlling the system described above is disclosed. The method comprises throttling the power engine air actuator based on a speed of the power producing engine to change an air-to-fuel ratio (λ) of the power producing engine.

According to another embodiment, a method of controlling the system described above is disclosed. The method comprises throttling the power engine fuel actuator based on a speed of the power producing engine to change an air-to-fuel ratio (λ) of the power producing engine.

BRIEF DESCRIPTION OF THE DRAWINGS

For a better understanding of the present disclosure, reference is made to the accompanying drawings, in which like elements are referenced with like numerals, and in which.

and

Figure 2:
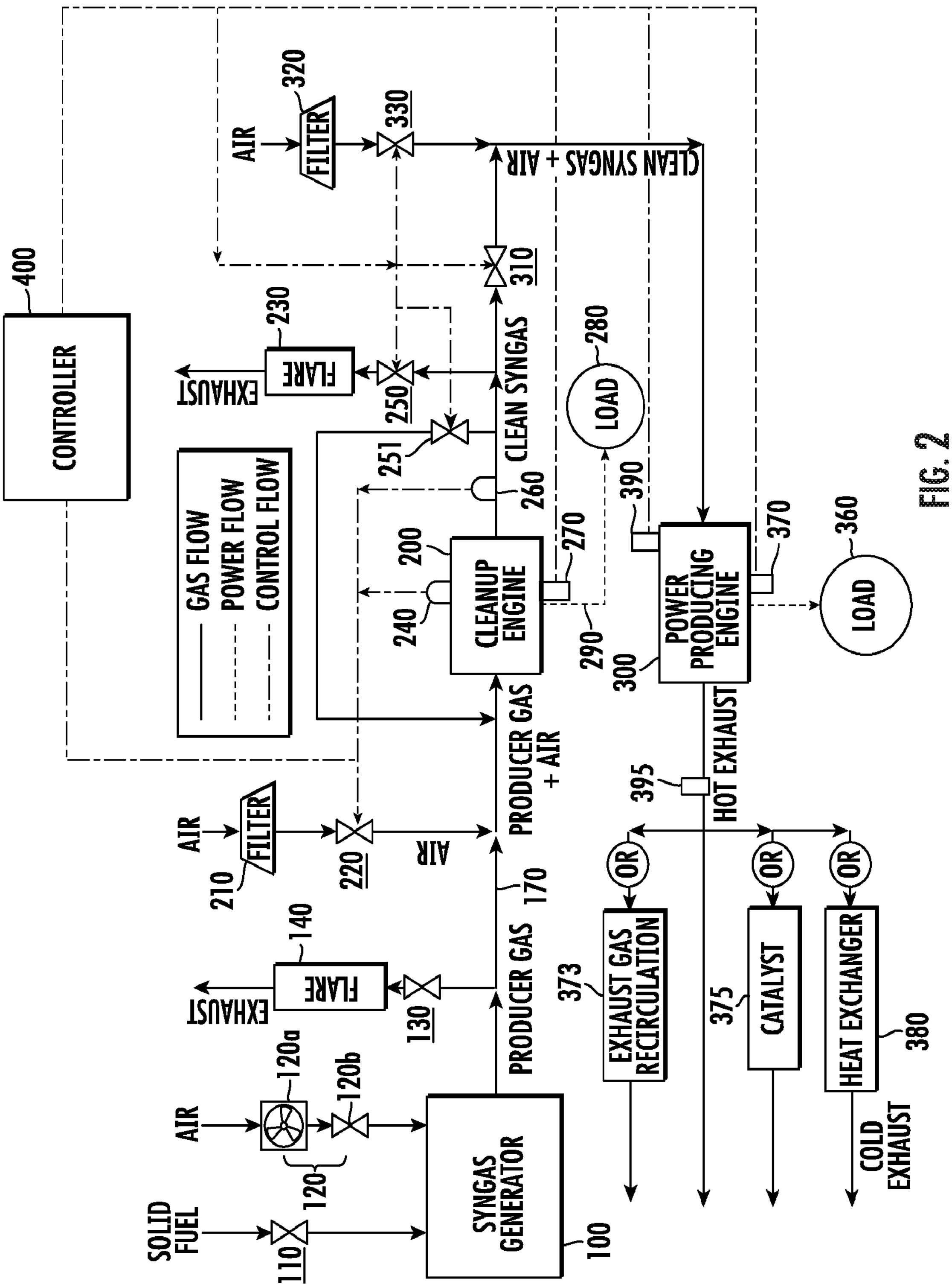

FIG. 2 shows an integrated power system with recirculated syngas.

DETAILED DESCRIPTION

Figure 1A:
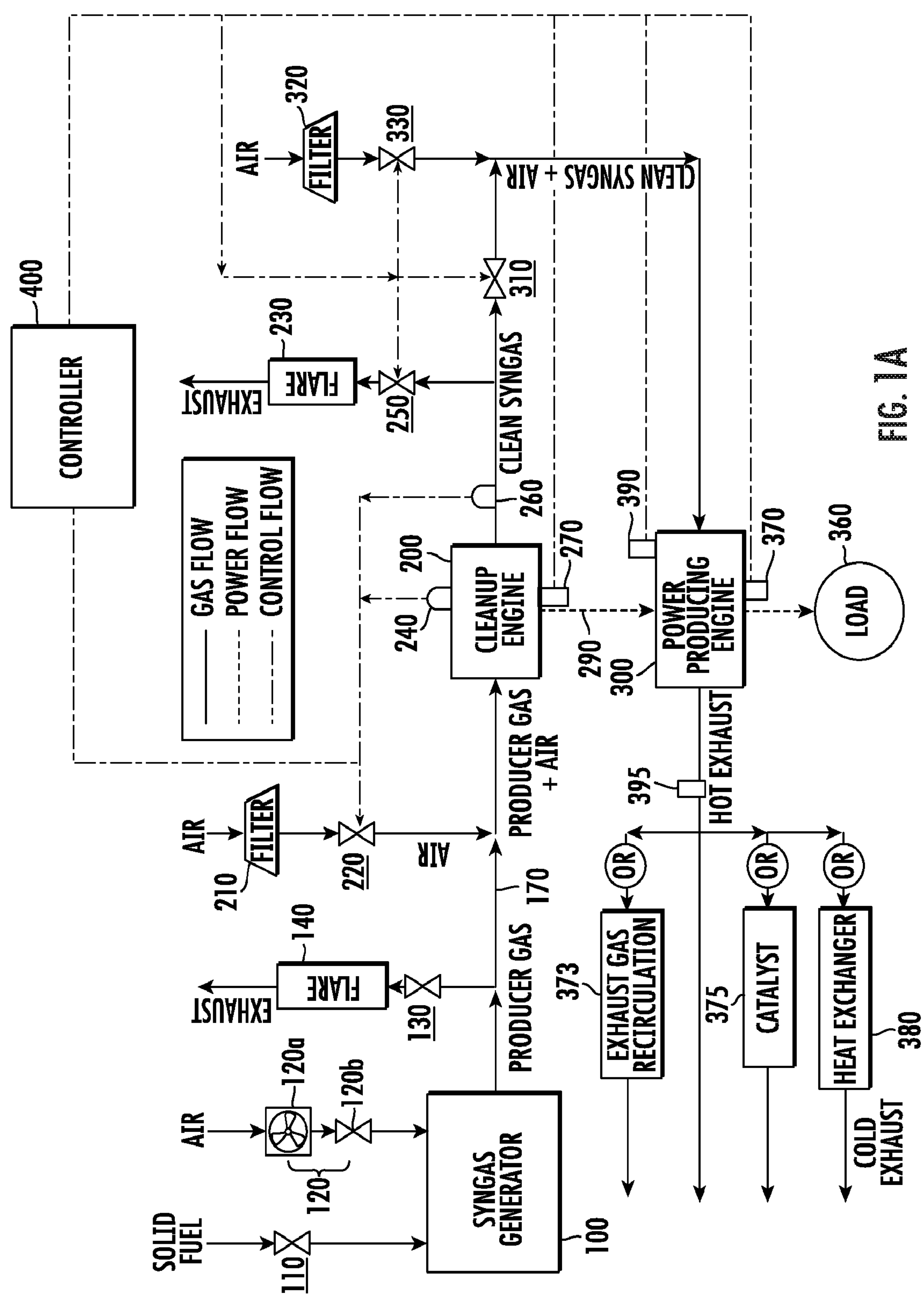
FIG. 1A is a first embodiment of an integrated power system.
Figure 1B:
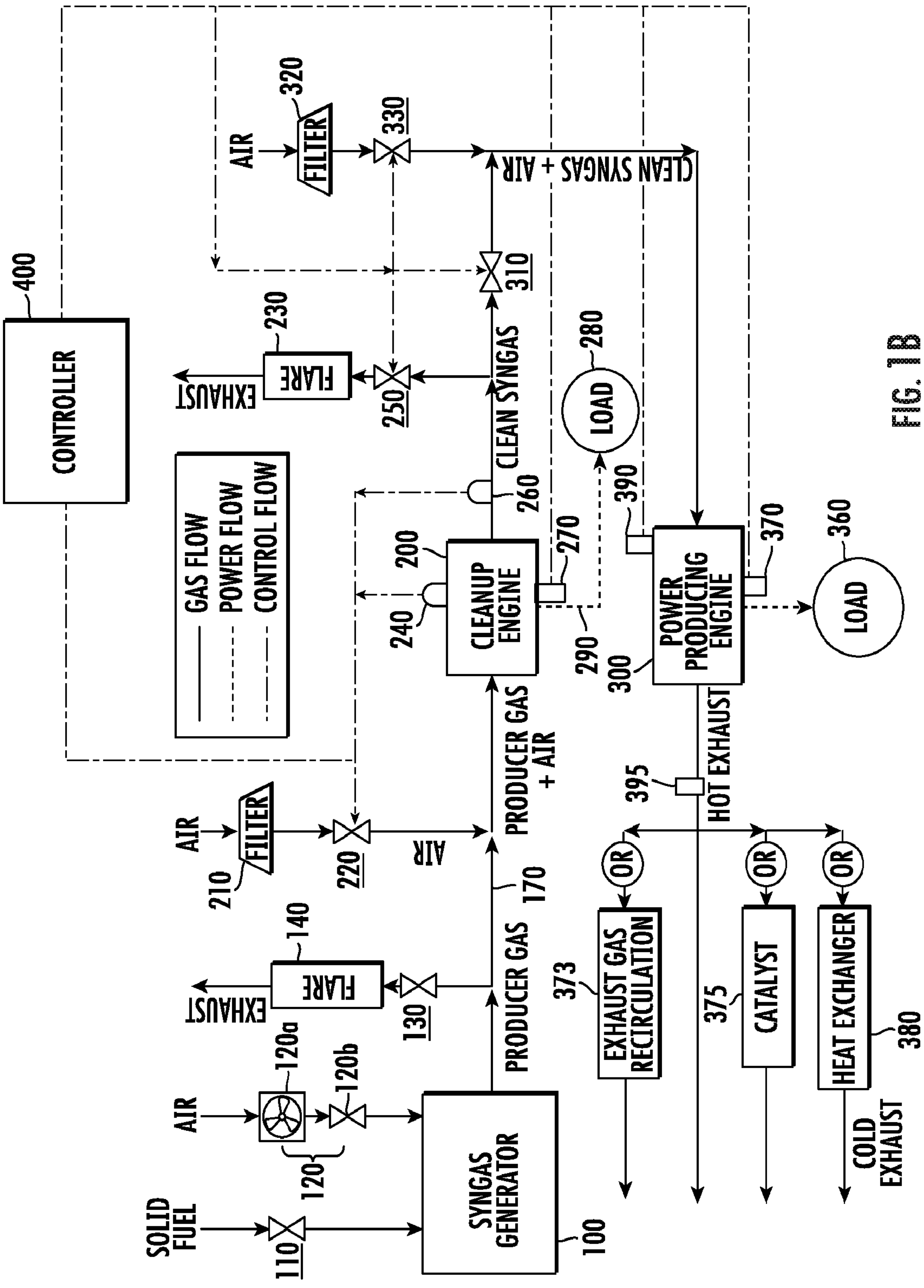
FIG. 1B is a second embodiment of an integrated power system.

FIGS. 1A-1B show an integrated system for converting solid fuel to gas, removing heavy organic contaminants ('tars') from the gas and generating power for any use according to two embodiments. In both embodiments, the integrated system comprises a syngas generator 100, a cleanup engine 200 and a power producing engine 300.

Each of the components will be described in more detail. The goal of the integrated system is to maintain the tar-laden producer gas temperature above the dew point of organic contaminants. That dew point is around 250-350° C. Therefore, if gas is never cooled below the tar dew point or the dew point of the heaviest tars and is combusted, there would be no need for expensive and complicated tar clean up equipment as the tar would simply get burned.

The syngas generator 100 may be a gasifier. Further, the syngas generator 100 may comprise other components, such as a high temperature filter or cyclone, to remove solid contaminants. Additionally, a heat exchanger may be part of the syngas generator 100. The structure of the syngas generator 100 is not limited by this disclosure.

In operation, biomass or other organic material is fed to a syngas generator 100. The syngas generator 100 generates a gas, which is a mixture of $CH_4$, CO, $H_2$, $H_2O$, $N_2$ and heavier organic components, referred to as 'tars'. Because the output of the syngas generator 100 contains components which are not typically considered to be syngas, the output of the syngas generator 100 is referred to as producer gas in this disclosure. This producer gas exits the syngas generator 100 at temperatures that can be in excess of 700 degrees centigrade.

The syngas generator 100 has two inputs, the solid fuel, which may be biomass, and an oxidant, such as air, pure oxygen and/or steam. In certain embodiments, a syngas fuel actuator 110 may be disposed prior to the input to the syngas generator 100 to regulate or stop the flow of solid fuel into the syngas generator 100. This syngas fuel actuator 110 may be a conveyor, such as a screw conveyor, a worm conveyor or a hopper. Additionally, a syngas air actuator 120 may be disposed prior to the input to the syngas generator 100 to control the flow of air or another oxidant into the syngas generator 100. In certain embodiments, the syngas air actuator 120 may comprise two components. For example, the syngas air actuator 120 may include a fan or blower 120*a* and a syngas air valve 120*b*. Thus, the syngas air actuator 120 may have three different states:

- disabled or closed, where the syngas air valve 120*b* is closed such that air cannot pass through the syngas air actuator 120;

enabled or open, where the syngas air valve 120*b* is open but the fan or blower 120*a* is disabled; and active, where the syngas air valve 120*b* is open and the fan or blower 120*a* is actuated.

In other words, when the syngas air actuator 120 is enabled, air is not forced into the syngas generator 100. However, the syngas generator 100 may still be able to draw air into the generator. Thus, enabling the syngas air actuator 120 without activating the fan or blower 120*a* does not stop the flow of air; it merely stops the flow of forced air. In other words, in induction mode, the engine sucks air through the syngas generator 100 without needing to actuate the fan or blower 120*a* in the syngas air actuator 120.

In certain embodiments, the air upstream of the syngas generator 100 may be compressed prior to introduction into the syngas generator 100. The air may be compressed using a suitable compressor, such as a turbocharger or a supercharger.

The outlet of the syngas generator 100 is in communication with the inlet to the cleanup engine 200. The outlet of the syngas generator 100 may be a manifold, pipe or other enclosed structure through which the producer gas may flow. Additionally, the outlet of the syngas generator 100 is in communication with a syngas flare actuator 130. The syngas flare actuator 130 may a valve that enables or blocks the flow of producer gas to the generator flare 140. The generator flare 140 is used to burn any producer gas that flow into the generator flare 140. In certain embodiments, the generator flare 140 may comprise an automated spark plug, sensors for emissions and means for emission control. In other embodiments, the generator flare 140 may be a length of pipe with an expansion to hold the flame that is manually lit. The generator flare 140 is used to ensure that producer gas, which contains poisonous carbon monoxide and explosive hydrogen gas, is not vented into the atmosphere. The generator flare 140 and the syngas flare actuator 130 may be connected via a manifold, pipe, tube or other suitable structure.

The outlet of the syngas generator 100 may also be in communication with a cleanup air actuator 220. The cleanup air actuator 220 may be a valve that controls the flow of air or another oxidant into the inlet of the cleanup engine 200. The cleanup air filter 210 and the cleanup air actuator 220 may be connected via a manifold, pipe, tube or other suitable structure.

In another embodiment, the cleanup air actuator 220 is in communication with the cleanup engine 200 through an inlet that is different from that used by the producer gas.

The cleanup engine 200 receives the producer gas from the syngas generator 100 and removes the tar. The cleanup engine 200 is an internal combustion engine, having one or more cylinders. Each cylinder may have one or more intake valves and one or more outlet valves. The cleanup engine 200 is designed to destroy tar in the producer gas while minimizing the energy consumption so that energy content of clean syngas is high enough to be used in the power producing engine 300. The cleanup engine 200 should therefore operate as rich as possible to maximize left over lower heating value gas to ensure stable combustion in the power producing engine 300 while ensuring that there was enough heat release in the cleanup engine 200 to destroy tar. Many ignition strategies can be used to achieve rich combustion in the cleanup engine 200, such as ignition sources such as spark-ignition and microwave-ignition, or compression ignition such as homogeneous charge compression ignition (HCCI), partially premixed compression ignition (PPCI), and reactivity controlled compression ignition (RCM, or a combination of two such as spark assisted HCCI.

The operating speed of cleanup engine 200 may be determined by a tradeoff between the gas throughput and the residence time at high temperature (near top dead center), which determines the destruction of the tars. The engine speed can be adjusted to match the production of the gas from the syngas generator 100 and thus the power produced (or the chemical production rate). Faster speeds result in higher temperatures at top dead center, as there is less time for heat transfer between the gas and the intake manifold/engine cylinder wall. In one embodiment, the engine speed of the cleanup engine 200 may be in a range between 600 revolutions per minute (RPM) and 1500 RPM. Also, it is possible that the engine speed is variable.

The compression ratio of cleanup engine 200 may be chosen to provide enough heat to result in sufficient temperatures at the chosen engine speed (that determines the residence time). High compression ratios may be preferred, while minimizing the changes required in the cleanup engine 200. Furthermore, the stability of the combustion of cleanup engine 200 increases with higher compression ratio. Increasing the compression ratio results in earlier autoignition of the air/fuel mixture in the cylinder (when operating with HCCI mode or spark-assist HCCI). Earlier ignition results in higher temperatures at top dead center. Additionally, increased combustion stability allows a richer air/fuel mixture to be achieved and thus a higher energy content of the clean syngas. In one embodiment, the compression ratio can be in a range between 11:1 and 22:1. Changing the engine compression ratio can be achieved by using a filler introduced from the outside to reduce the volume at top dead center (for example, introduced through the spark plug port or through the glow plug port.

A glow plug may be used in some embodiments, especially when the original cleanup engine is a diesel engine, to help achieve early autoignition when operating in HCCI or spark assisted HCCI operation. In addition, either passive or active prechambers may be used to help increase the stability of the combustion, especially when the combustion is very rich. Prechambers have been proposed for very lean operation, but not for rich operation.

Although operation over a wide range of air-to-fuel ratios is possible, for some applications, the highest quality of the gaseous exhaust from the cleanup engine 200 occurs with very rich operation. The preferred operation may be a relative air-to-fuel ratio of between 0.1 to 0.5 or equivalent ratio (inverse of relative air-to-fuel ratio) of between 2 to 10. The relative air-to-fuel ratio can be adjusted depending on operation (gasifier operating conditions, feedstock, ambient temperature).

In the case of fuel synthesis, in addition to minimizing the loss of heating value of the fuel, it is important to reduce the methane concentration and increase the hydrogen to carbon monoxide ratio, as both methanol and Fischer Tropsch processes require a hydrogen to carbon monoxide ratio of about 2. Partial oxidation in the cleanup engine 200 preferentially eliminates hydrogen, but it can also be used to decrease the level of methane generated by the gasifier. The operating conditions of the cleanup engine 200 can be adjusted (inlet temperature, air-to-fuel ratio, engine speed) to both achieve a high degree of syngas cleanup while also conditioning the gas for further downstream processing. One interesting approach is to use a small electrolyzer to provide some additional hydrogen to the reaction, without having to depend upon gas-water shift. In this embodiment, the co-produced oxygen could be used in the cleanup engine 200.

In addition or alternatively, the tail gas from the liquid synthesis reactor could be conditioned and reintroduced into the cleanup engine 200 (for example, through hydrogen recycling).

The producer gas is mixed with air that passes through cleanup air filter 210. In all embodiments, the mixture fed to the cleanup engine 200 is a rich mixture, where the amount of air is less than the stoichiometric amount, up to and including the possibility of running without any free oxygen.

The mixing of the producer gas and the air could take place outside or inside the cylinder of the cleanup engine 200. In certain embodiments, the producer gas and the air may be introduced through different intake valves in the cylinder. In another embodiment, the producer gas and the air may be injected separately just upstream of their respective intake valves so that, for enhanced safety, there is limited mixing outside of the cylinder. The rich mixture is subsequently compressed inside the cylinders of cleanup engine 200. Even without assistance from an ignition source such as a spark plug, the rich mixture will auto-ignite and partially burn at some point during the compression stroke. Because there is only a limited amount of air available, the auto-ignition in this case is controlled. Only a small amount of the fuel will burn. The pressure and temperature rise, as well as the rise rate, are therefore not destructive for the engine hardware. The in-cylinder temperatures may not be high enough to cause any damage to the engine but they are sufficiently high to destroy the tars. Thus, in certain embodiments, the cylinders of the cleanup engine 200 do not employ an ignition source. Rather, they rely on the rich mixture and high pressure and temperature from engine compression to cause ignition. In other embodiments, a spark plug can be used.

In certain embodiments, it may also be beneficial to control the air/fuel mixture. The additional air for the cleanup engine 200 could be preheated upstream from the manifold, using heat from the exhaust of the power producing engine 300, such as through a heat exchanger 380. The air and producer gas can be premixed upstream from the manifold, or mixed in the manifold or in the cylinder. It is best, in the case where the air is colder than the producer gas, to prevent mixing upstream from the cylinder. It may be desirable to establish stratification on the manifold, to locate clean air in the regions of the valve stem, while keeping the producer gas hotter than if premixed, to minimize tar deposits on the valve stem. Tar deposits on the valve can be minimized by having the producer gas at a higher temperature during the cylinder induction than if premixed with the colder air.

After the tars have been destroyed by the high temperatures caused by compression and partial combustion in the cleanup engine 200, gas is exhausted by the cleanup engine 200. This outputted gas may be referred to as clean syngas, since it lacks the heavy organic components or tars that were present in the intake to the cleanup engine 200.

In addition to creating clean syngas, the combustion within the cylinders of the cleanup engine 200 may rotate a drive shaft 290.

In the embodiment shown in FIG. 1A, the drive shaft 290 is shared with the power producing engine 300. In another embodiment, shown in FIG. 1B, the drive shaft 290 is not shared and may be in communication with a load 280. This load 280 may be a mechanical power plant, for example. Additionally, a power speed sensor 370, such as a tachometer, may also be disposed at the drive shaft of the power producing engine 300. This power speed sensor 370 may be used to measure the RPM of the power producing engine 300. In another embodiment, if the load 360 is an AC power generator, the frequency of the electrical power produced can be measured by an electrical frequency sensor, as this is representative of engine speed.

The outlet from the cleanup engine 200 may be a manifold, pipe, tube or other suitable structure. The outlet from the cleanup engine 200 is in communication with a cleanup flare actuator 250. The cleanup flare actuator 250 may be a valve that enables or blocks the flow of clean syngas to the cleanup flare 230. The cleanup flare 230 is used to burn any clean syngas that flows into the cleanup flare 230. In certain embodiments, the cleanup flare 230 may comprise an automated spark plug, sensors for emissions and means for emission control. In other embodiments, the cleanup flare 230 may be a length of pipe with an expansion to hold the flame that is manually lit. The cleanup flare 230 is used to ensure that syngas, which contains poisonous carbon monoxide, is not vented into the atmosphere. The cleanup flare 230 and the cleanup flare actuator 250 may be connected via a manifold, pipe, tube or other suitable structure. As with the generator flare 140, the heat from the cleanup flare 230 can be used for process heating. Further, the heat from the cleanup flare 230 may also be used to heat the coolant or oil that circulates through the cleanup engine 200 and/or the power producing engine 300. This may be achieved using a heat exchanger.

A cleanup exhaust temperature sensor 260 may be disposed at the outlet of the cleanup engine 200 to measure the temperature of the exhausted syngas. In certain embodiments, the temperature sensor may be a thermocouple or other temperature measuring devices.

Additionally, a cleanup engine sensor 240 may be disposed proximate the cleanup engine 200. In certain embodiments, the cleanup engine sensor 240 may be an accelerometer (knock sensor) either mounted outside or inside of engine cylinder or another acoustic device. In other embodiments, the cleanup engine sensor 240 may be an acoustic sensor. In certain embodiments, the cleanup engine sensor 240 may include both an accelerometer and an acoustic sensor.

Additionally, a cleanup speed sensor 270, such as a tachometer, may also be disposed at the drive shaft 290. This cleanup speed sensor 270 may be used to measure the RPM of the drive shaft 290. In the embodiment shown in FIG. 1A, the cleanup engine 200 and the power producing engine 300 are coupled, either through coupling or via a shared drive shaft 290. Thus, the cleanup speed sensor 270 may also allow the controller 400 to measure the RPM of the power producing engine 300.

The outlet of the cleanup engine 200 is also in communication with a power engine fuel actuator 310. The power engine fuel actuator 310 may be a valve that enables or blocks the flow of clean syngas to the power producing engine 300.

The power producing engine 300 receives air via power engine air actuator 330, which may be a valve. The air may pass through a power engine air filter 320, which may be located upstream from the power engine air actuator 330 and in communication with the power engine air actuator via a manifold, pipe or tube. The filtered air is mixed with the clean syngas and enters the inlet of the power producing engine 300. This may occur within a cylinder of the power producing engine 300 or may occur upstream from the cylinders. The power producing engine 300 may be a spark ignited engine or a compression ignited engine in homogeneous charge compression ignition (HCCI) mode. In other embodiments, the power producing engine 300 may be a dual fuel engine where a small amount of diesel fuel is compression ignited, which then serves to ignite the syngas, much like a spark plug that burns the syngas with a flame front.

The power producing engine 300 generates power, which may be in the form of mechanical rotation of the drive shaft 290. As described above, in the embodiment shown in FIG. 1A, the drive shaft 290 is shared between the cleanup engine 200 and the power producing engine 300. In this embodiment, a load 360 may be in communication with the drive shaft 290. The load 360 may be a mechanical power plant used to create electricity. In other embodiments, such as that shown in FIG. 1B, the drive shaft 290 is not shared, and the drive shaft from the power producing engine 300 is in communication with load 360.

The controller 400 may include a processing unit, such as a microcontroller, a personal computer, a special purpose controller, or another suitable processing unit. The controller 400 may also include a non-transitory storage element, such as a semiconductor memory, a magnetic memory, or another suitable memory. This non-transitory storage element may contain instructions and other data that allows the controller 400 to perform the functions described herein.

The controller 400 is in communication with the power speed sensor 370 so as to monitor the operation of the power producing engine 300. The controller 400 is also in communication with the power engine air actuator 330 and the power engine fuel actuator 310 so as to control the flow of air and fuel into the power producing engine 300. In certain embodiments, the controller 400 is also in communication with a power engine sensor 390, A sensor 395 and/or a temperature sensor (not shown). In certain embodiments, the power engine sensor 390 may be a knock detector used to detect knock in the power producing engine 300. The power engine sensor 390 may be an accelerometer (knock sensor) either mounted outside or inside of engine cylinder or another acoustic device. In other embodiments, the power engine sensor 390 may be an acoustic sensor. In certain embodiments, the power engine sensor 390 may include both an accelerometer and an acoustic sensor.

Having described aspects of the system, the control of the power producing engine 300 will be described in more detail.

As described above, there are two possible embodiments. There is a first embodiment where the cleanup engine 200 shares the same rotational shaft with power producing engine 300, as shown in FIG. 1A; and a second embodiment where the cleanup engine 200 does not share the same rotational shaft with power producing engine 300, as shown in FIG. 1B.

In both embodiments, the load may be an electric generator that produces electricity to an electric grid, such as a microgrid, or it may be a unit, such as pump, that produces mechanical work for various purposes.

For each configuration, there are different timescales of load change and therefore different required engine control adjustments.

The fastest timescales are those dictated by electrical stability requirements. These requirements may include maintaining AC power frequency and voltage levels in a microgrid environment when large (as a percentage of the total generation in the microgrid) loads are connected or disconnected. In this scenario, the required response time for the electric generator ranges from a few electrical cycles (which may be −20 ms each) to a few seconds.

The slowest timescales of load change are usually slower than 30 minutes to an hour and usually refer to more predictable behavior of many smaller loads such as diurnal changes in a large grid due to many consumers using less electricity at certain times.

In the embodiment of FIG. 1A, when two engines are sharing a common drive shaft 290, there is only one load 360 coupled to the power producing engine 300. If the load 360 is an electric generator, there are two options for the use of the power producing engine 300 to produce electricity, depending on whether the electricity is DC or AC.

Although there are disadvantages because the need for a rectifier in the case of DC operation of the microgrid, DC may be easier to use in limited microgrids. One of the advantages of DC is that the electric generator can operate at relatively high frequencies, making the electric generator smaller and the control of the power producing engine 300 simpler, since the engine speed can be modulated. One advantage of higher frequency electric generator is that the rectification is easier. However, the rectification component adds a substantial cost to the system. Although more expensive, it has longer lifetimes than the power producing engine and lower maintenance. The power producing engine can operate at relatively high/variable engine speed, producing more power for a given peak pressure in the engine or as limited by engine knock.

If the power grid is AC, the speed of the power producing engine 300 should be tightly controlled as it is proportional to electric power frequency. It is usually operating at 1800 rpm in order to generate 60 Hz with a 4-pole electric generator.

In one embodiment, the system has low power rating, such as 10 kW to 20 kW. In order to reduce costs, automotive electric generators, used in typical electric and hybrid vehicles, are within this range. These electric motor/generators are mass produced, with low costs. In contrast, the stationary electric generators that have low production volume may be more costly. Therefore, using an automotive electric motor/generator can reduce the system cost significantly. One advantage of using automotive motor electric generators is that they are set up with rectifiers to produce DC voltage, also mass produced as thus, inexpensive. If AC is desired, an inverter can be used to generate the desired frequency.

In either case of a DC or AC microgrid, any changes in the load will change engine speed. In the case of an AC microgrid, the system should respond to the change and maintain the engine speed. Because of the requirement for constant engine speed, power can only be adjusted by modifying the engine torque (measured as mean brake torque). A cleanup speed sensor 270 or a power speed sensor 370 can be used to monitor the engine speed. Changes in engine speed can be detected and compensated for by throttling or unthrottling the power engine fuel actuator 310 and/or the power engine air actuator 330.

For fast load control, cleanup flare actuator 250, power engine fuel actuator 310, power engine air actuator 330 and the spark timing in the power producing engine 300 may be controlled. For example, for variations in load of 5% or less, changes to spark timing can be employed. This will affect the operation of the engine in milliseconds.

For variations in load of up to 90%, adjustments to the power engine fuel actuator 310, the power engine air actuator 330, and cleanup flare actuator 250 may be employed. It may take seconds to affect the operation of the engine in this case. In one embodiment (of variations in load of up to 90%), the power engine fuel actuator 310 and the power engine air actuator 330 may be adjusted to throttle or unthrottle the power producing engine 300 while maintaining the air-to-fuel ratio (λ) at a constant value. In most embodiments, this constant value may be stochiometric operation or lean operation. This will change the power output of the power producing engine 300. In certain embodiments, the air-to-fuel ratio may be measured by a commercial A sensor 395 inserted in the exhaust of the power producing engine 300. Power engine sensor 390 may be used to monitor engine knock and communicate with controller 400 to adjust spark timing and throttle of the engine accordingly to prevent engine knock.

In a second embodiment (of variations in load of up to 90%), power engine air actuator 330 or power engine fuel actuator 310 may be adjusted to change the air-to-fuel ratio (λ) of the power producing engine 300 while keep the engine unthrottled. This will change the power output of the power producing engine 300 by making combustion either lean ($\lambda>1$) or rich ($\lambda<1$). For certain embodiments where the power engine fuel actuator 310 is adjusted and the power engine air actuator 330 is remain unchanged, less syngas and more air will be drawn into the power producing engine 300. The power producing engine 300 is unthrottled but operated with lean combustion. This will reduce the power output of the power producing engine 300. Power engine sensor 390 may be installed on power producing engine 300 to prevent engine knocking and engine stalling from abnormal and unstable combustion, respectively. In another embodiment, where the power engine air actuator 330 is adjusted and the power engine fuel actuator 310 is to remain unchanged, less air and more syngas will be drawn into the power producing engine 300. The power producing engine 300 is unthrottled but operated with rich combustion. This will increase or decrease the power output of power producing engine 300, depending on the richness of engine operation. Power engine sensor 390 may be installed on power producing engine 300 to prevent engine knocking and engine stalling from abnormal and unstable combustion, respectively. A catalyst convertor 375 may be used at the exhaust of the power producing engine 300 to neutralize the harmful gasses in the rich burned exhaust, such as hydrocarbons and carbon monoxide, with the addition of some air downstream of the power producing engine 300. The catalytic convertor may be a three-way catalytic convertor (TWC) or others. If the catalyst is a three-way catalyst, there may be an oxygen sensor (not shown) downstream from the power producing engine 300, and means for controlling the air flow to the power producing engine 300.

Note that if the power producing engine 300 is spark-ignited, then spark timing can also be adjusted to control the power output. Spark timing is normally set at maximum brake torque (MBT) for the highest power output. Advancing or retarding the spark timing away from MBT point will decrease the engine power output. The spark timing can be used individually or together with either of the embodiments listed above. Power engine sensor 390 may be used on power producing engine 300 to prevent engine knocking and engine stalling that introduced by spark timing adjustment.

In some embodiments, the power engine fuel actuator 310 may be partially closed, allowing less syngas to pass through. This may cause the pressure to build up in the manifold between cleanup engine 200 and power engine fuel actuator 310. To relieve this pressure, cleanup flare actuator 250 may be adjusted to relieve the pressure. In this embodiment, surplus syngas may be burned via cleanup flare 230.

In certain embodiments, by partially closing the power engine fuel actuator 310 to the power producing engine 300, it may be possible to build the back pressure (pressure in the exhaust) of the cleanup engine 200, reducing the throughput through the cleanup engine 200 (and thus, the power producing engine 300). Increasing the pressure of the exhaust of the cleanup engine 200 results in increased residuals in the cleanup engine 200, and thus, reduced throughput even at constant speed. The approach can also be achieved by using variable valve timing in the cleanup engine 200, but the exhaust throttling is a less expensive approach.

In certain embodiments, rather than burning the excess syngas, this surplus syngas can be recirculated back to the intake of cleanup engine 200 for higher efficiency. In one embodiment, cleanup flare actuator 250 may be a three-way valve so the exhaust of cleanup engine 200 can also be connected to the intake of cleanup engine 200. Alternatively, as shown in FIG. 2, a recirculation actuator 251 may be used to control the amount of cleaned syngas that is recirculated back to the intake of the cleanup engine 200. Accordingly, syngas air actuator 120 and the syngas fuel actuator 110 need to be adjusted so that the flow of producer gas flow from the syngas generator 100 to the cleanup engine 200 can be reduced. The cleanup air actuator 220 may be adjusted to the optimal A for tar cleanup.

For slow load control, the flow of solid fuel and air into the syngas generator 100, and thus the producer gas flow rate, may be changed. To optimize tar cleanup, cleanup air actuator 220 should be adjusted to the optimal λ for tar cleanup (which can be determined from a lookup table). For example, when the load demand is reduced, the flow through syngas air actuator 120 and the syngas fuel actuator 110 are decreased so that less producer gas is produced and flowed into the cleanup engine 200. Cleanup air actuator 220 also may be turned down to maintain the appropriate λ to the cleanup engine 200.

In the second embodiment, shown in FIG. 1B, the two engines are not sharing a common shaft. However, since there is still a load 360 coupled to the power producing engine 300, the control of the power producing engine 300 is the same as described above.

Furthermore, in either embodiment, the load 360 connected to the power producing engine 300 can be controlled electrically such that the electric generator is always at constant load. For example, a power electronics system may feed excess electric power to a load bank to convert to heat or an energy storage system such as a battery. For example, thyristors, or rectifiers may be used to convert the AC voltage to a DC voltage at an amplitude that can be used to charge the load bank. In this way, since the power produced by the power producing engine never changes, the air-to-fuel ratio (λ) of the cleaned syngas entering the power producing engine 300 remains unchanged throughout operation.

Note that throttling is used in certain embodiments. This throttling may result in inefficient engine operation due to the pumping losses. To reduce the pumping losses, an exhaust gas recirculation (EGR) unit 373 attached to the output of the power producing engine 300 may be used. The recirculated exhaust gas may be connected to the intake of cleanup engine 200 and/or the intake of power producing engine 300, and/or to the air intake of the syngas generator 100. For example, an adjustable valve may be disposed between the EGR unit 373 and the intake of the cleanup engine 200. The exhaust gas will be recirculated due to the induction process of the cleanup engine 200 and the expelling process of the power producing engine 300. The amount of exhaust gas to be recirculated is controlled by the adjustable valve.

When EGR is used, the air intake of the cleanup engine 200 needs to be adjusted for the best performance. For example, the air intake of cleanup engine 200 needs to be adjusted for the optimized tar destruction result.

Other variations are also possible. For example, in the case of DC microgrid, it is possible to operate the power producing engine 300 at high torque, but reducing the engine speed. In this manner, the engine efficiency remains relatively constant as the power is varied. Power variation can be done without throttling and the flow rate through the system (including the syngas generator 100 and the cleanup engine 200) adjusted accordingly. Relative fast variation of the output of the system may be obtained in this manner. The voltage of the integrated power system can be set to one of the multiple standards that are being developed for DC microgrids. 48 V is the standard for telephone and datacenter UPS. But other can be used, including 270 V. The higher voltages result in decreased cost of power conversion equipment and cabling.

Depending on the combustion process, the exhaust from the power producing engine 300 may be very hot. This heat may be recovered by a heat exchanger 380. The heat extracted by the heat exchanger 380 may be in a variety of ways. For example, the heat may be used to dry the biomass/air feed to syngas generator 100, which will reduce the tar content in the producer gas. The heat may also be used to pre-heat the manifold between syngas generator 100 and the cleanup engine 200 to avoid tar condensation. Further, the heat may be a system output and used to heat water, for instance.

The heating value of the clean gas may be low, and thus combustion in the power producing engine 300 may result in misfire. In order to avoid misfire in the power producing engine 300, hot clean syngas may be used, to increase the manifold temperature of the gases entering the power producing engine, which would result in improved ignitability of the cylinder air/fuel mixture. This operation would result in reduced power in the power producing engine 300, and control of the intake gas temperature can be used for controlling the power produced in the power producing engine 300, when not compromised with ignition instability. To avoid knock in the engine, lower compression ratios (lower than the standard 10:1 in modern engines) could be used in the power producing engine 300, or adjustment of the spark timing.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An integrated system for producing power from solid fuels, comprising:

a syngas generator to form producer gas from solid fuels;

a cleanup engine in communication with an outlet of the syngas generator to remove tar from the producer gas and create cleaned syngas;

a power producing engine in communication with an outlet of the cleanup engine to generate power;

a power engine fuel actuator disposed between the outlet from the cleanup engine and an inlet of the power producing engine, wherein the power engine fuel actuator is adjusted and pressure builds up at the outlet of the cleanup engine, and wherein the pressure serves to reduce a power output of the cleanup engine;

a power engine air filter;

a power engine air actuator in communication with the power engine air filter and an inlet of the power producing engine;

a sensor to determine a speed of the power producing engine; and a controller in communication with the power engine fuel actuator, the power engine air actuator, and the sensor.

2. The integrated system of claim 1, wherein the sensor to determine the speed of the power producing engine comprises a speed sensor.

3. The integrated system of claim 1, further comprising an electric generator coupled to a drive shaft of the power producing engine, and wherein the sensor to determine the speed of the power producing engine comprises an electrical frequency sensor.

4. The integrated system of claim 1, wherein the controller throttles the power engine fuel actuator and the power engine air actuator based on the speed of the power producing engine.

5. The integrated system of claim 4, wherein exhaust gas from the power producing engine is recirculated to an inlet of the power producing engine, the cleanup engine and/or the syngas generator to reduce pumping losses caused by throttling.

6. The integrated system of claim 1, further comprising a power engine sensor to detect knock in the power producing engine, and wherein the controller is in communication with the power engine sensor.

7. The integrated system of claim 6, wherein the controller throttles the power engine fuel actuator and the power engine air actuator based on the speed of the power producing engine and a signal from the power engine sensor.

8. The integrated system of claim 6, wherein an air-to-fuel ratio (A) of the power producing engine is kept constant.

9. The integrated system of claim 1, further comprising a recirculation actuator to allow syngas exhausted from the cleanup engine to recirculate to an inlet of the cleanup engine.

10. The integrated system of claim 9, wherein the controller controls the recirculation actuator based on the speed of the power producing engine.

11. The integrated system of claim 10, further comprising:

a generator flare;

a syngas flare actuator disposed between an output of the syngas generator and the generator flare;

a cleanup air filter;

a cleanup air actuator disposed between an inlet of the cleanup engine and the cleanup air filter;

and wherein the controller is in communication with the syngas flare actuator and the cleanup air actuator to modify a flow rate of producer gas and air to the cleanup engine.

12. The integrated system of claim 1, wherein the controller throttles the power engine air actuator based on the speed of the power producing engine to change an air-to-fuel ratio (λ) of the power producing engine.

13. The integrated system of claim 12, wherein a catalytic converter is disposed at an outlet of the power producing engine to neutralize gasses when the air-to-fuel ratio becomes rich.

14. The integrated system of claim 1, wherein the controller throttles the power engine fuel actuator based on the speed of the power producing engine to change an air-to-fuel ratio (λ) of the power producing engine.

15. The integrated system of claim 1, wherein spark timing is modified based on the speed of the power producing engine.

16. The integrated system of claim 1, further comprising:
- a cleanup flare; and
- a cleanup flare actuator disposed between an output of the cleanup engine and the cleanup flare;
- wherein the controller is in communication with the cleanup flare actuator such that excess syngas at the output of the cleanup engine is burned in the cleanup flare by opening the cleanup flare actuator.

17. The integrated system of claim 1, further comprising an electric generator coupled to a drive shaft of the power producing engine.

18. The integrated system of claim 17, wherein a battery or load bank is in electrical communication with the electric generator, such that the load presented by the electric generator to the power producing engine is constant.

19. A method of controlling a system for producing power from solid fuels, wherein the system comprises:
- a syngas generator to form producer gas from solid fuels;
- a cleanup engine in communication with an outlet of the syngas generator to remove tar from the producer gas and create cleaned syngas;
- a power producing engine in communication with an outlet of the cleanup engine to generate power;
- a power engine fuel actuator disposed between the outlet from the cleanup engine and an inlet of the power producing engine;
- a power engine air filter;
- a power engine air actuator in communication with the power engine air filter and an inlet of the power producing engine;
- a sensor to determine a speed of the power producing engine; and
- a controller in communication with the power engine fuel actuator, the power engine air actuator, and the sensor, and wherein the method comprises:
- throttling the power engine fuel actuator and the power engine air actuator based on a speed of the power producing engine.

20. The method of claim 19, comprising:
- throttling the power engine fuel actuator and the power engine air actuator based on the speed of the power producing engine and a signal from a power engine sensor, wherein the power engine sensor detects knock in the power producing engine.

21. The method of claim 19, wherein an air-to-fuel ratio (λ) of the power producing engine is kept constant.

22. A method of controlling a system for producing power from solid fuels, wherein the system comprises:
- a syngas generator to form producer gas from solid fuels;
- a cleanup engine in communication with an outlet of the syngas generator to remove tar from the producer gas and create cleaned syngas;
- a power producing engine in communication with an outlet of the cleanup engine to generate power;
- a power engine fuel actuator disposed between the outlet from the cleanup engine and an inlet of the power producing engine;
- a power engine air filter;
- a power engine air actuator in communication with the power engine air filter and an inlet of the power producing engine;
- a sensor to determine a speed of the power producing engine; and
- a controller in communication with the power engine fuel actuator, the power engine air actuator, and the sensor, and wherein the system further comprises a recirculation actuator to allow syngas exhausted from the cleanup engine to recirculate to an inlet of the cleanup engine, the method comprising:
- controlling the recirculation actuator based on a speed of the power producing engine.

* * * * *